US006923562B2

(12) United States Patent
Leathley et al.

(10) Patent No.: US 6,923,562 B2
(45) Date of Patent: Aug. 2, 2005

(54) HEADLIGHT ASSEMBLY HAVING VERTICAL HEADLAMP ADJUSTER

(75) Inventors: Robert A. Leathley, Livonia, MI (US); Jeff Sanfrey, Lorain, OH (US); Edward M. Kalis, Sandusky, OH (US); Stephen D. McCarthy, Farmington Hills, MI (US); Gregory A. Stoi, Royal Oak, MI (US); James Fassett, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 58 days.

(21) Appl. No.: 10/612,423

(22) Filed: Jul. 2, 2003

(65) Prior Publication Data

US 2005/0002200 A1 Jan. 6, 2005

(51) Int. Cl.[7] .................................... F21V 17/02
(52) U.S. Cl. ................. 362/514; 362/277; 362/282; 362/428; 362/515; 362/528; 362/532
(58) Field of Search ............... 362/514, 515, 362/512, 528, 507, 532, 277, 282, 428, 529, 273, 322, 459, 464, 487, 257, 523–525, 269–271, 284, 319; 248/482, 125.1, 283.1, 466, 475.1, 476, 479, 481, 485, 486, 121, 121.1, 124.1, 200, 274.1, 276.1, 278.1, 282.1, 288.11, 288.31, 289.11

(56) References Cited

U.S. PATENT DOCUMENTS

| 4,578,740 A | | 3/1986 | Krizmanic | |
|---|---|---|---|---|
| 4,839,785 A | | 6/1989 | Ohishi | |
| 4,843,523 A | * | 6/1989 | Nakamura | 362/528 |
| 4,965,706 A | | 10/1990 | Reiland | |
| 5,065,293 A | * | 11/1991 | Mochizuki | 362/462 |
| 5,067,052 A | * | 11/1991 | Suzuki et al. | 362/462 |
| 5,446,630 A | * | 8/1995 | Chikada et al. | 362/524 |
| 5,573,326 A | * | 11/1996 | Iijima | 362/528 |
| 5,993,032 A | | 11/1999 | Herbers | |
| 6,017,136 A | | 1/2000 | Burton | |
| 6,247,834 B1 | | 6/2001 | Suehiro | |

FOREIGN PATENT DOCUMENTS

FR            2598127        11/1987

* cited by examiner

Primary Examiner—John Anthony Ward
Assistant Examiner—Ismael Negron
(74) Attorney, Agent, or Firm—Brinks Hofer Gilson & Lione

(57) ABSTRACT

A vertically adjustable headlight assembly having a headlight housing, a reflector positioned within the housing and an adjuster mechanism including a channel and an adjustment member. An end of the adjustment member is accessible outside of the housing and the other end is received in the channel. When advanced or retracted, the end of the adjustment member travels within the channel causing the reflector to pivot within the housing and vertically adjust.

17 Claims, 3 Drawing Sheets

HEADLIGHT ASSEMBLY HAVING VERTICAL HEADLAMP ADJUSTER

TECHNICAL FIELD

This invention generally relates to a headlight assembly and, more specifically, to a headlight assembly having a vertical headlight adjustment mechanism.

DESCRIPTION OF THE RELATED ART

It is well known to use adjustment mechanisms to align the vertical and horizontal position of a vehicle's headlight with respect to the vehicle itself. Known adjustment mechanisms use complex, multi-component systems.

One such system, generally known as a "right angle adjuster", includes two shafts positioned perpendicular to each other, joined by a gear box and attached to the reflector. One disadvantage of this type of system is that it is more likely to bind due to the horizontal displacement of its pivot in a constant vertical plane. Other known systems utilize constant adjusters that are accessed from the rear of the headlight housing. These types of systems are difficult to access due to the tight packaging of the components under the hood of the vehicle.

In view of the above and other disadvantages, there exists a need for an improved headlight assembly with a simplified adjustment procedure and mechanism. It is an object of this invention to provide such an assembly.

SUMMARY OF INVENTION

The present invention overcomes the disadvantages of prior designs by providing a less complex adjustment mechanism for a headlight assembly. The headlight assembly of the present invention includes a headlight housing, a reflector positioned within and pivotally connected to the housing by at least two connection or pivot points, an adjuster clip connected to the reflector, and an adjuster screw that is partially received within the clip and threadably engaged with the assembly's housing. For convenience and ease of use, the adjuster is accessible from the top of the headlight assembly. As torque is applied to the adjuster screw, the entire reflector radially pivots about a transverse horizontal pivot axis, which is defined by the connection points. Accordingly, the aim of the headlight is vertically adjusted.

To ensure that the assembly does not bind during adjustment, a lower most head of the adjuster screw is received and rides within an arc shaped channel in the adjuster clip. The arc of the channel is such that pivoting of the adjuster clip with the headlight will not cause binding on the generally vertically oriented adjuster screw in the clip.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
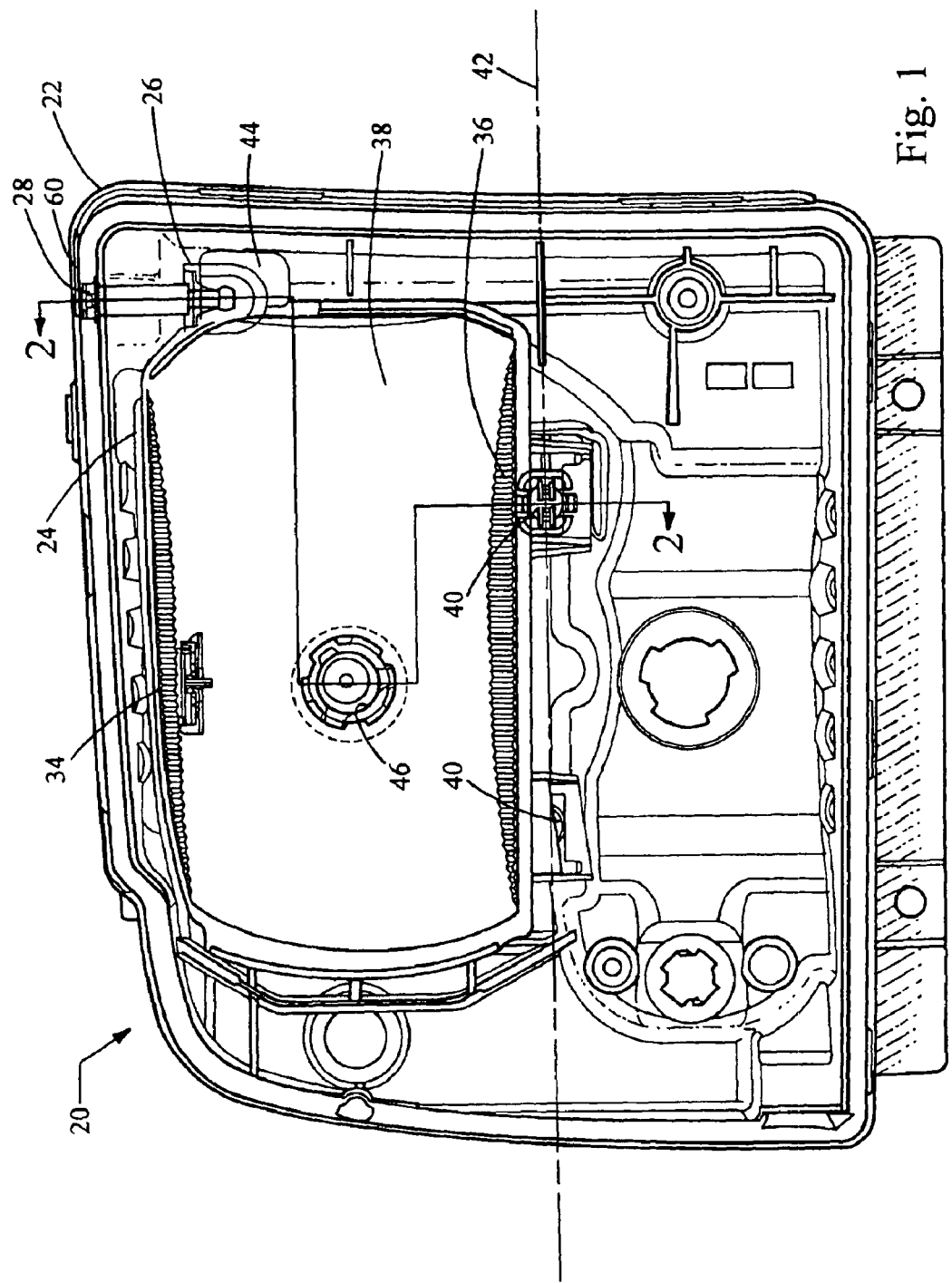
FIG. 1 is a front elevational view of a headlight assembly embodying the present invention.

Referring now to the drawings, FIG. 1 generally illustrates a headlight assembly 20 embodying the principles of the present invention and specifically adapted for use in a motor vehicle (not shown). The headlight assembly 20 includes as its primary components, a housing 22, a reflector 24, an adjustment assembly 26 and a pair of pivots 40. Preferably, two headlight assemblies 20 are mounted to the front of a vehicle, one located on each side thereof.

The housing 22 is connected to the frame of the vehicle through one or more mounting bores 31. Accordingly, the housing 22 is fixed in a stationary position relative to the vehicle.

In the illustrated embodiment, the housing 22 defines a recessed cavity 32 for receipt of the reflector 24. The reflector 24 itself is defined by a top wall 34, a bottom wall 36, and a curved rear wall 38 extending between the top and bottom walls 34, 36 that also defines the sides of the reflector 24. (Directional references used herein are relative to the orientation of the vehicle and are solely intended to aid in clarity.) As shown in FIG. 1, the headlight assembly 20 is provided for mounting on the passenger side, or right side, of the vehicle. A headlight assembly mounted to the driver's side, or left side, of the vehicle would be a mirror image of the assembly 22 seen in FIG. 1.

Figure 2:
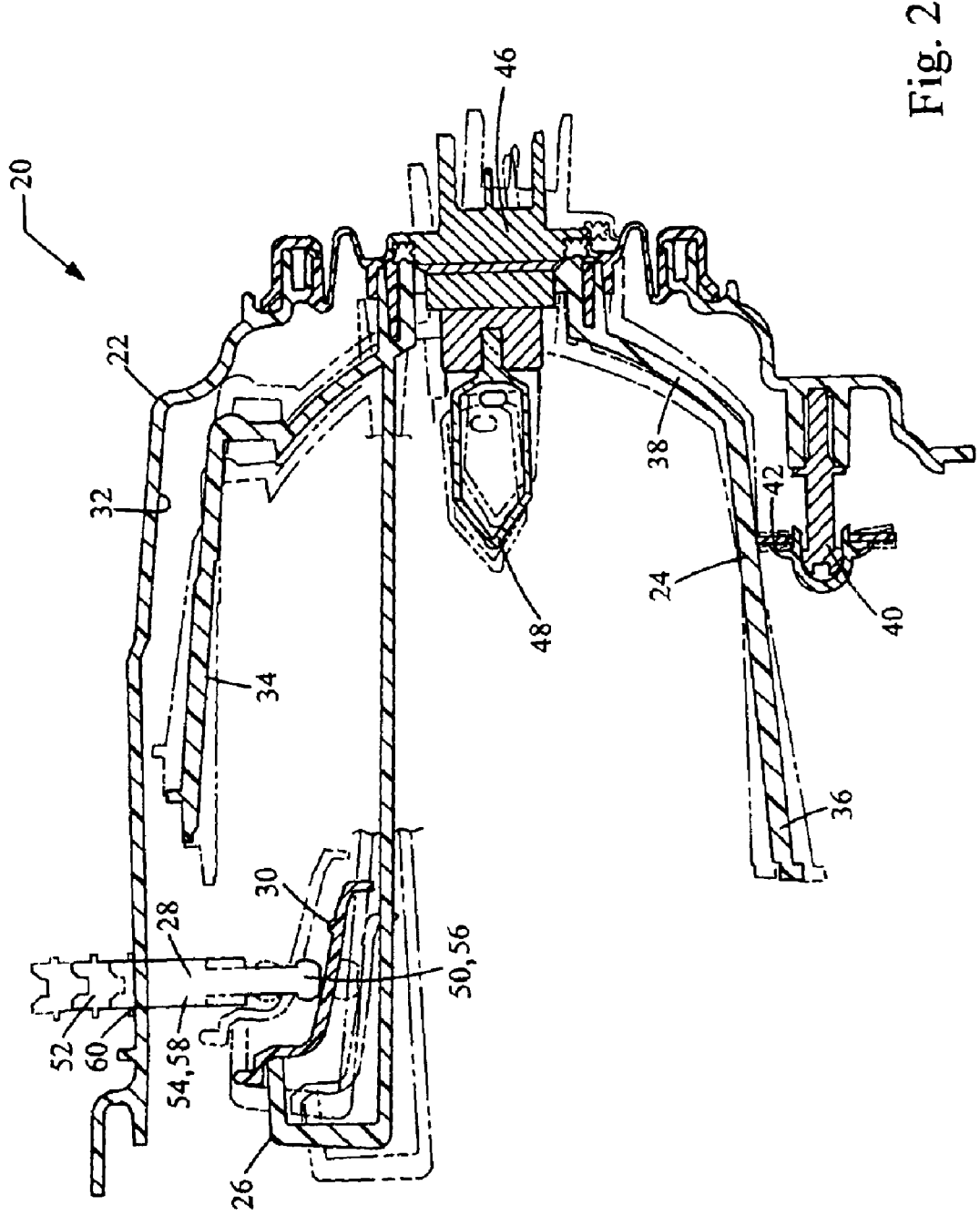
FIG. 2 is a cross-sectional view generally taken along line 2—2 of FIG. 1.

Located immediately below the bottom wall 36 of the reflector 24 are the pivots 40, which include a pivot clip 44 and a pivot screw 46 that are more readily seen in FIG. 2. As seen in FIG. 2, the pivot clip 44 is snap fit or friction mounted to a mounting bracket 48 generally extending from the bottom wall 36 of the reflector. The central portion of the pivot clip 44 defines a socket 50 which retainingly engages and receives a ball shaped head 52 of the pivot screw 46. Opposite the head 52, the pivot screw 46 is provided with a fastening end 54. In the preferred embodiment, the fastening end 54 is provided with threads or other means enabling the pivot screw 46 to be engaged with a mounting boss 56 located on the housing 22 so as to be generally adjacent to the mounting brackets 48 of the reflector 24. The utilization of two pivots 40 helps to restrict movement of the reflector 24 to rotation about a pivot axis 42 while illustrated as having a ball-and-socket type construction. As will be obvious to one skilled in the art, the specific construction of the pivots 40 need not be limited to a ball-and-socket joint construction. Other constructions, such as those utilizing axles, pins or other means, would equally be acceptable, so long as the pivots permit rotation of the reflector 24 about the pivot axis 42.

The reflector 24 also includes portions 58 defining an aperture 60 for receipt of a light source, hereafter bulb 62. Preferably, the aperture 60 is located on the rear wall 38 of the reflector 24, generally near the center thereof. Mounting of the bulb 62 in the aperture 60 may be achieved by any now known, such as a twist-lock engagement mechanism or hereafter developed method.

Figure 3:
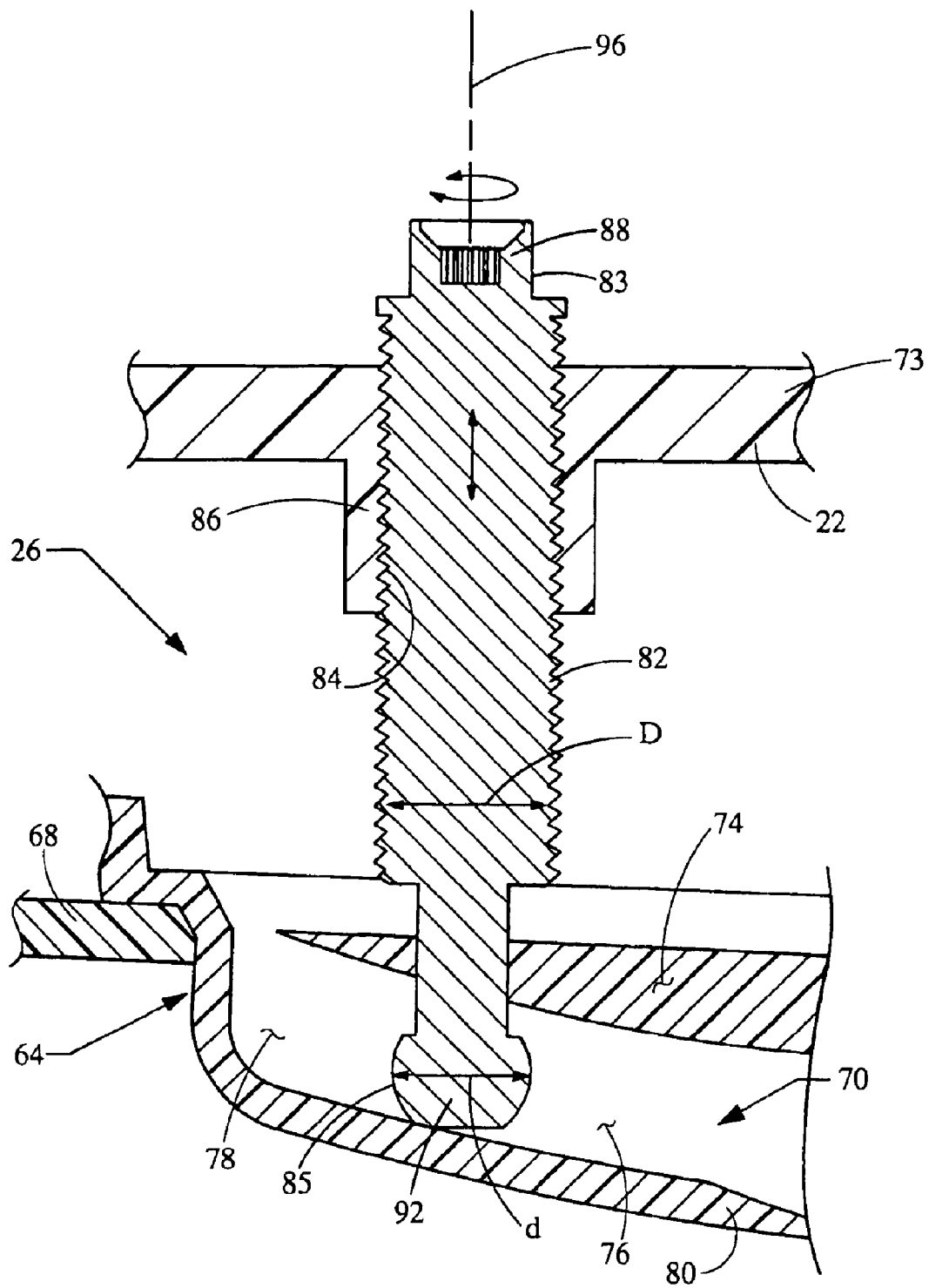
FIG. 3 is an enlarged cross-sectional view of the adjuster screw and clip generally encircled by line 3—3 in FIG. 2.

Referring now to FIGS. 2 and 3, the adjustment assembly 26 as seen therein includes an adjustment clip 64 and an adjustment or aiming screw 28. The adjustment clip 64 is secured to the reflector 24 by way of a mounting bracket 68 integrally formed with the reflector 24. Any suitable engagement mechanism can be utilized to retain the adjustment clip 64 with the mounting bracket 68, including without limitation, frictional, interference, snap-fit, adhesive and others. Formed in the adjustment clip 64 is a channel 70 which is generally U shaped in cross-section having a more narrow opened end 72, as seen in FIG. 1, oriented in the direction of the top wall of the housing 22. As such, two opposed shoulders 74 define the open end 72. Along its length, the channel 70 is curved or arc shaped as seen in FIG. 3. The nature and orientation of this curve or arc is such that the rear most portion 76 of the channel 70 is generally vertically lower than the forward most portion 78 of the channel 70. The reasons for the arced shape of the channel 70 will become apparent from the discussion which follows below. While it may be provided with a fixed lower wall, the lower most wall 80, as illustrated, is provided as a cantilevered member from the remainder of the adjustment clip 64, enabling the lower most wall 80 to resiliently deflect relative to the remainder of the clip 64.

The aiming screw 28 includes a threaded middle section 82 that is received within a threaded bore 84 defined in a boss: 86 of the housing 22. The aiming screw 28 may be provided with a self-tapping screw thread such that the threaded bore is formed in the boss 86 when the screw 28 is installed. The first end or the upper end 83 of the aiming screw 28 is formed with a driving head 88 suitably shaped to receive a driving tool (not shown) form imparting rotation to the aiming screw 28. The opposing or second end 85 of the screw 28 is provided with a generally round or ball head 32. The aiming screw 28, boss 86 and channel 70 of the adjustment clip 64 are all oriented such that when fully assembled, the driving head 68 of the aiming screw 28 extends generally vertically through the top wall 73 of the housing 22, while the ball head 92 is received within the channel 70.

For ease of assembly, the diameter "d" of the ball head 92 is less than the diameter "D" of the threaded bore 84. As such the bull head 92 can be inserted through the threaded bore 84 as the aiming screw 28 is mounted therein via the threaded middle section 82.

With the aiming screw 28 in the boss 86, the reflector 24, with the clip 64 attached, is positioned within the housing 22 such that the ball head 94 is received through the rearward end 76 of the clip 64. Thereafter, the ball head 94 is upwardly restrained within the channel 70 by the shoulders 74 that define a reduced width slot above the ball head 94.

Assembled as such, when further torque is applied to the driving head 88 of the aiming screw 28, be it advancement or retraction of the aiming screw 28, the engagement between the ball head 92 and the channel 70 will cause pivotal movement of the reflector 24. Advancement, downward rotation of the aiming screw 28, causes the ball head 92 to apply a downward force against the lower wall 80 of the channel 70. In response to the downward force, the reflector 24 pivots about the pivot axis 42 in a downward direction and the ball head 92 slides toward the rearmost portion 76 of the channel 70. Upon retraction, upward rotation of the aiming screw 28, the ball head 92 exerts an upward force on the shoulders 74 of the channel 70 causing the reflector 24 to pivot about the pivot axis 42 in an upward direction. During upward pivoting, the ball head 92 slides within the channel toward the forward most portion 78 thereof. From this, it is seen that the arc shape of the channel 70 provides for nonlinear vertical displacement of the reflector 24 in response to torque applied to the aiming screw 28. Further, while the aiming screw 28 only moves along a linear axis, the arc shape of the channel 70 prevents binding with the ball head 92 as the reflector 24 pivots relative to the aiming screw axis 96.

In an alternative embodiment, the adjustment clip 64 is unitarily formed with the reflector 24 and is such that the channel 70 is directly incorporated into a portion of the reflector 24.

Constructed in this manner, the orientation of the adjustment clip 64 and its channel 70, relative to the reflector 24, is not critical to the operation of the headlight assembly 20. This in turn frees design and construction possibilities from the normal constraints related thereto.

As a person skilled in the art of vehicle headlight systems will recognize from the previous detailed description and from the figures and claims, modifications and changes can be made to the preferred embodiments of the invention without departing from the scope of this invention defined in the following claims.

What is claimed is:

1. A headlight assembly comprising:

a housing having a top wall, a bottom wall, a rear wall and an open front, said top, bottom and rear walls cooperating to define a housing cavity within said housing;

a reflector located within said housing cavity, said reflector including a top wall, a bottom wall, a rear wall and an open front, said top, bottom and rear walls cooperating to define a reflector cavity within said reflector, said reflector being connected to said housing by at a pivot such that said reflector is rotatable and vertically adjustable about a pivot axis;

a vertical adjuster mechanism including an adjustment member having a first end accessible from outside said housing cavity and a second end located within said housing cavity, said adjustment member being coupled to said housing and moveable between advanced and retracted positions relative to said housing cavity, said adjuster mechanism further including portions defining a channel located within said housing cavity and said portions being fixedly connected to said reflector, said second end of said adjustment member being received within said channel for relative movement therein; and whereby movement of said adjustment member between said advanced and retracted positions causes said reflector to be vertically adjusted as said second end moves within said channel.

2. The headlight assembly of claim 1 wherein said reflector is connected to said housing by two pivots and said two pivots defining said pivot axis.

3. The headlight assembly of claim 1 wherein said adjustment member extends through said top wall of said housing.

4. The headlight assembly of claim 1 wherein said adjustment member is obliquely positioned relative to said pivot.

5. The headlight assembly of claim 1 wherein said channel has an arc shape.

6. The headlight assembly of claim 1 wherein said channel includes a rearward end and a forward end, said arc shape of said channel arcing downward from said forward end to said rearward end.

7. The headlight assembly of claim 1 wherein said portions defining said channel are formed in an adjustment clip mounted to said reflector.

8. The headlight assembly of claim 1 wherein said adjustment member extends through a bore in said housing defining a first diameter, said second end of said adjustment member defining an effective diameter that is less than said first diameter.

9. The headlight assembly of claim 1 wherein said pivot is adjacent to said bottom wall of said reflector.

10. The headlight assembly of claim 1 wherein said pivot is a ball-and-socket joint.

11. The headlight assembly of claim 10 wherein a socket portion of said ball-and-socket joint is connected to said reflector and a ball portion of said ball-and-socket joint is connected to said housing.

12. The headlight assembly of claim 1 wherein said adjustment member includes a threaded portion threadably engaged with said housing.

13. The headlight assembly of claim 12 wherein said threaded portion is located between said first and second ends of said adjustment member.

14. The headlight assembly of claim 1 wherein said second end of said adjustment member includes a head, said head being received within said channel.

15. The headlight assembly of claim 14 wherein said head is a ball-shaped head.

16. The headlight assembly of claim 1 wherein said channel has an open end open in a direction toward said top wall of said housing.

17. The headlight assembly of claim 16 wherein said open end defines a diameter that is less than a diameter of said second end of said adjustment member.

* * * * *